Sept. 29, 1964　　　　　J. L. JONES　　　　　3,150,426
ROTATABLE FASTENER
Filed May 29, 1962
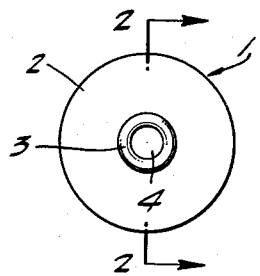
FIG. 1.
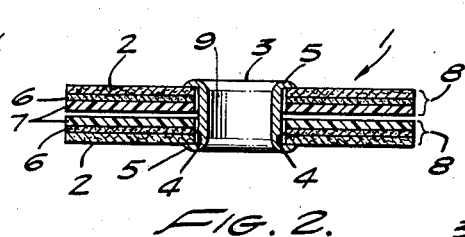
FIG. 2.
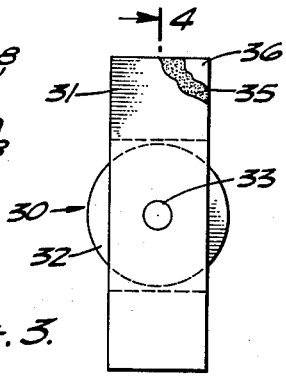
FIG. 3.
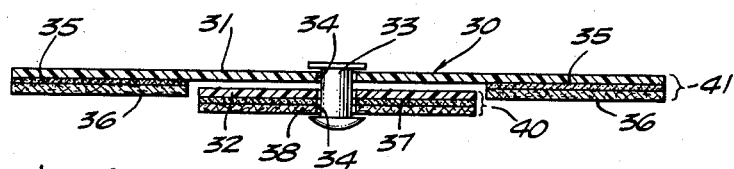
FIG. 4.
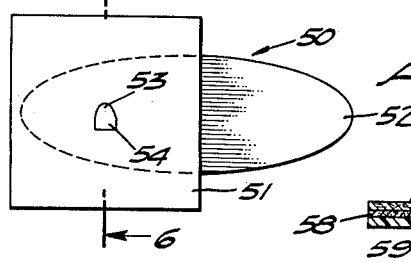
FIG. 5.
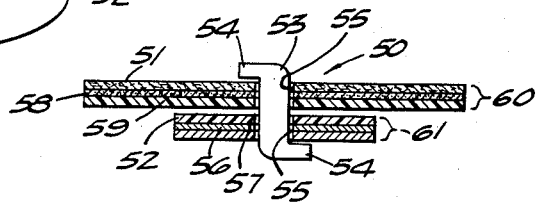
FIG. 6.
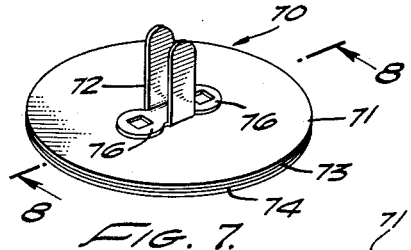
FIG. 7.
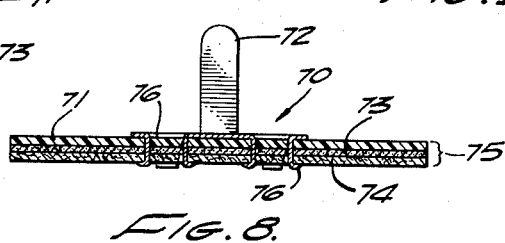
FIG. 8.
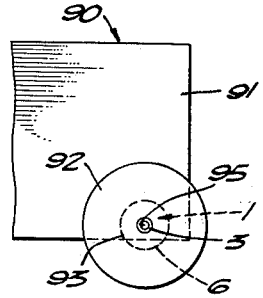
FIG. 9.
FIG. 10.
INVENTOR.
John Leslie Jones

United States Patent Office 3,150,426
Patented Sept. 29, 1964

3,150,426
ROTATABLE FASTENER
John Leslie Jones, 1070 Glen Oaks Blvd.,
Pasadena, Calif.
Filed May 29, 1962, Ser. No. 198,491
4 Claims. (Cl. 24—67)

This invention relates to fasteners and folders for binding typewritten, printed or other pages. This invention is a continuation-in-part of my application Serial Number 151,865 filed November 13, 1961, on pronged paper fasteners.

Included in the objects of my invention are:

First, to provide an improved inexpensive rotatable fasteners for paper sheets, cardboard, other sheet structures and the like.

Second, to provide a simple, easily applied, rotatable fastener for securing two paper sheets together, enabling them to rotate.

Third, to provide a rotatable fastener for a pair of paper sheets, cardboard, plastic sheets or the like.

Fourth, to provide a rotatable fastener means for securing two flat sheets together and to provide relative rotation means for one sheet with respect to the other.

Further objects of this invention will become apparent in the following description.

Reference is directed to the accompanying drawings in which:

FIGURE 1 is a plan view of a flexible rotatable fastener of my invention.

FIGURE 2 is an enlarged cross sectional view through 2—2 of FIGURE 1.

FIGURE 3 is another modification of my rotatable fastener invention in a plan view.

FIGURE 4 is an enlarged cross sectional view through 4—4 of FIGURE 3.

FIGURE 5 is still another modification of my rotatable fastener invention in plan view.

FIGURE 6 is an enlarged cross sectional view through 6—6 of FIGURE 5.

FIGURE 7 is an enlarged isometric projection view of another modification of my improvement in rotatable fasteners.

FIGURE 8 is an enlarged cross sectional view through 8—8 of FIGURE 7.

FIGURE 9 is an elevational view of an application of my rotatable fasteners.

FIGURE 10 is still another elevational cross sectional view of an application of my rotatable fasteners.

Referring to FIGURE 1 in detail, my rotatable fastener 1 is shown, wherein the circular disc 2 is illustrated in plan view with an axial securing means 3 partially filling the opening 4 centrally disposed in the disc 2. FIGURE 2 illustrates an enlarged cross sectional view of my fastener 1, not strictly drawn to scale due to the space requirements for detailing the plurality of layers in my device 1. The two discs 2 are composed of a release coated backing piece paper or a paper impregnated with a release formulation, said release coating or release impregnant being coplanar adjacent and co-extensive with the two pressure sensitive adhesive coatings 6 and each separate disc 2 mounted on said coating. The adhesive coatings 6 are permanently mounted on and completely covering one side of the two body section discs 7. The body section discs 7 may be materials such as varnish coated cardboard, varnish coated paper, thin plastic sheeting, thin metal foil or the like. The varnish coatings on the cardboard and paper are to reduce the coefficient of friction of the two adjacent disc surfaces when they are freely rotated in contact with each other, about the axial securing means 3. A laminated disc shaped structure 8 is composed of the release coated backing piece paper disc 2 adjacent to the adhesive coating 6, which in turn is spread over the surface of the body section disc 7. The two laminated disc structures 8 are secured on the eyelet axial means 3, which has flat flanges 5 securing the two discs 8 concentrically together, the openings 4 in the discs being larger in diameter than the outside diameter of the eyelet 3, providing a freely rotatable axial means 3, with a hollow opening 9.

Referring to FIGURES 3 and 4 in detail, a modification of my rotatable fastener 30 is shown in plan view in which the rectangular sheet body section 31 is shown, superimposed over the circular sheet body section 32, the two parts being secured together by the rivet pivot means 33. The partial sectional view of FIGURE 3 illustrates the underlying pressure sensitive adhesive layer 35 and the backing piece 36 underlying the adhesive 35. FIGURE 4 is an enlarged cross sectional view through 4—4 of FIGURE 3, only partially to scale, since the thin layers in the view can not be shown to scale without unduly increasing the size of the views. The laminated structure 41 is composed of the body section 31, made of cardboard, heavy paper, plastic sheet, thin metal foil or the like. Over symmetrically located end area portions of the body section 31 are spread the two separate adhesive coatings 35, permanently secured to and completely covering the end area portions of 31. A pair of release coated backing piece papers 36 or a pair of papers impregnated with a release formulation impregnant, are coextensive and coplanar mounted on said coatings 35, release coat or release impregnant being contiguously adjacent said adhesive coatings 35. The laminated disc structure 40 is likewise composed of the body section 32, of a composition similar to those listed for section 31, a pressure sensitive adhesive coating 37 completely covering and permanently affixed to 32, and a release coated backing piece paper 38, or a paper impregnated with a release formation, is coplanar mounted on and coextensive with said coating 37, said paper 38 having the release coated side adjacent the adhesive coating 37. The solid rivet pivot means 33 may be a metal rivet or a plastic rivet, having flat or shallowly rounded rivet heads. I adjust the diameter of the rivet pivot means 33 to fit freely in the opening 34, providing free, independent rotation of the laminated structures 40 and 41 about the pivot means 33. The body sections 31 and 32 are selected from materials of construction providing low friction coefficient materials in rotating contact with each other, on rotating laminated structures about the pivot means 33.

Referring to FIGURES 5 and 6, I show another modification of my rotatable fastener 50, in which the laminated structure 60 is shown secured in a rotatable coaxial relation to the laminated structure 61. My view in FIGURE 5 shows the square release paper portion 51 superimposed over the elliptical body section 52 and the two rotatable laminated structures secured together by the pivot means 53, locked by the two flat pivot ends 54. The laminate structure 60 is composed of the square body section 59, made of cardboard, heavy paper, plastic sheet, thin metal foil or the like; a pressure sensitive adhesive coating 58 completely covers one side of the body section 59 and is permanently secured thereto; and a release coated backing piece paper 51, or a backing piece paper impregnated with a release formulation, is coplanar mounted on and coextensive with said adhesive coating 58, the release coated side of the paper 51 contiguously adjacent to the adhesive coating 58. The laminated structure 61 is composed of a body section 52, of similar material composition as 59, and with relatively low friction coefficients with respect to each other for 52 and 59; a pressure sensitive adhesive coating 56 completely covers one side of the body section 52, and is permanently secured thereto; a release coated backing piece 57, or a paper impregnated with a release formulation, is coplanar mounted on and coextensive with the adhesive coating 56, release coated side contiguously adjacent the adhesive coating 56. The laminated structures 60 and 61 are coaxially located by the openings 55, with the body sections 52 and 59 adjacent, and secured together by the pivot pin means 53, having the two flat ends 54. The openings 55 are sufficiently larger in diameter than the pin means 53, so that the structures 60 and 61 are freely rotatable with respect to each other.

Referring to FIGURES 7 and 8 in detail, I show another modification of my improvement in rotatable fasteners 70. The disc 71 is the top layer of a laminated structure 75 composed of the body section 71, made of material typically listed for the body sections of FIGURES 1–6; the pressure sensitive adhesive layer 73, completely covering and permanently mounted on one side of the body section 71; and a release coated backing piece paper 74, or a paper impregnated with a release formulation, said backing piece paper 74 coplanar mounted on and completely covering the adjacent adhesive coating 73. On the side of the body section 71 opposite the adhesive coating 73 is centered and mounted the two prong clasp 72, said clasp 72 being anchored to the laminate structure 75 by the two base anchors 76. The two prongs clasp 72 is shown in an upright or vertical position, but the prongs 72 may also be bent flat to the laminated disc structure 75.

In FIGURE 9 I show an application of my fastener modification of FIGURES 1 and 2. A cardboard wagon cut-out of the type constructed by young children, from manufactured and colored designs on flat sheets of paper, commonly does not have rotating wheels. Using my fastener 1, I simply remove the release coated paper backing pieces 2 from both laminated discs 8, affix one disc adhesive coating 6 to the back bed of the wagon 91, as at disc 93, and adhesively secure a cut-out paper wheel 92 to the second disc adhesive coating 6, centering the wheel 92 on the disc 93 by indexing a cut-out center hole 95 in the paper wheel 92, to coincide with the diameter of the eyelet fastener 3, said fastener 3 also serving as a decorative axle hub. Four wheels so affixed at marked positions on the wagon bed can be rotated.

In FIGURE 10 I show another application of my rotatable fasteners of the type illustrated in FIGURES 3 and 4. In a cross sectional view, the fastener 30 has been stripped of the release coated backing pieces 36 and 38, and the two adhesive coatings 35 are mounted on a back side of the cardboard 100, said cardboard 100 having a circular opening 104 therein, and said opening 104 being larger in diameter than the body section disc 32. The disc 32 is centrally located within the opening 104. The adhesive coating 37 on the one side of the body section disc 32 is secured concentrically to the larger cardboard disc 102, shown in cross section by the adhesive coating 37. The whole assembly 103 is suitable for an inexpensive toy or scientific experiment device for children. For example, the side of the disc 102 opposite the cardboard sheet 100 may be varicolored in a plurality of pie shaped sectors of a circle. When the multicolored wheel is rapidly spun, the wheel, if the colors are properly selected, turns white, illustrating the principle of color composition.

Obviously there are many other applications of my rotatable fasteners, in the handling and processing of business papers, manufacturing processes, and other toy and game devices. I do not wish to be specifically limited by the applications described above.

In my invention the body section is an integral piece of a reasonably flexible sheet stock such as paper, cardboard, thin metal foil such as aluminum, plasticized cellulose acetate, plasticized vinyl chloride, polyvinyl chloride-vinylidene chloride, polyethylene, polypropylene, styrene, nylon, or plasticized cellulose acetate butyrate or the like. Essentially in my invention modifications wherein two body sections are in rotating contact, it is preferable that the adjacent surfaces of the two body sections in frictional contact have low frictional force values, to permit ready rotation of the body sections with respect to each other. It is also preferable that the openings in the two adjacent body sections, mentioned just above, also be sufficiently larger in diameter than the pivotal fastener means which secures the body sections together, to permit ready rotation of the two adjacent body sections without undue force being required.

In general I may adjust the length and width of my body section as may be desired or preferred. The body sections may be circular, rectangular or square or any other geometrical shape. The various geometrical shaped body sections may be combined as is preferred.

A pressure sensitive adhesive coating is permanently spread coextensively over a portion or all of one surface of the body section. Coextensive and coplanar with the pressure sensitive adhesive coating on the body section is a flexible backing piece selected from such materials as paper, cloth, non-woven cellulose film or the like. The flexible backing piece is provided with a release coating on one side or impregnated on one side with a release impregnant, which in either case provides ready release of the flexible backing piece from the normally tack pressure sensitive adhesive coating to which it is secured, release coated surface contiguously coextensive with and coplanar mounted on the pressure sensitive adhesive. The release coated or impregnated backing pieces are shaped into separately removable sections of backing pieces.

Obviously many modifications and variations of my improvements in combinations of rotatable fasteners are possible in the light of the above teachings. It is therefore understood that within the scope of the appended claims, the invention may be practiced otherwise than as specifically described or specifically covered by my claims.

I claim:

1. A rotatable fastener comprising: a pair of separate body sections; pressure sensitive adhesive coatings covering at least a portion of only one side of each said body section and permanently secured to said one side; release coated flexible backing pieces each separately coplanar mounted on and coextensive with one of said adhesive coatings, said backing pieces being coated to permit ready removal of said backing piece; and a freely rotatable pin means permanently coaxially adjacently securing together said pair of body sections through openings in said body sections, confronting portions of said body sections being free of said adhesive coatings.

2. A rotatable fastener comprising: a pair of separate body sections; pressure sensitive adhesive coatings covering all of one side of each said body section and permanently secured to said side; a pair of release coated flexible backing pieces each separately coplanar mounted on and coextensive with each one of adhesive coatings, said backing pieces being coated to permit ready removal of said backing pieces; and an axial pin means permanently coaxially adjacently securing together said pair of body sections through openings in said pair of body sections, said body sections being freely rotatable on said pin means and said confronting portions of said body sections being free of said adhesive coatings.

3. A rotatable fastener comprising: a pair of separate body sections; pressure sensitive adhesive coatings each separately covering one side of body section and permanently secured to said side; a release coated flexible backing piece coplanar mounted on and coextensive with each said adhesive coating, said backing piece being coated to permit ready removal of said backing piece; and an axial securing means penetrating and permanently adjacently securing together said pair of body sections, said body sections being freely rotatable about said securing means, and confronting portions of said body sections being free of said adhesive coating.

4. A rotatable fastener comprising: a first body section having a first pressure sensitive adhesive coating covering at least a portion of only one side of said first body section, and a first release coated flexible backing piece coplanar mounted on and coextensive with said first adhesive coating, and a clasp fastener permanently secured to the side of the first body section opposite said first adhesive coating; and a second body section having a second pressure sensitive adhesive coating covering at least a portion of only one side of said second body section, a second release coated flexible backing piece, a release coat coplanar mounted on and coextensive with said adhesive coating, with an opening in said second body section; and said second body section being concentrically secured to said first body section by said clasp extending through said opening in said second body section said first pressure sensitive adhesive coating and said second pressure sensitive pressure coating being arranged in outside face positions on the adjacent said first and second body sections.

References Cited in the file of this patent

UNITED STATES PATENTS

| | | |
|---|---|---|
| 739,201 | Morton | Sept. 15, 1903 |
| 1,648,408 | Kumagai | Nov. 8, 1927 |
| 1,999,633 | Greenhood | Apr. 30, 1935 |
| 2,030,135 | Carpenter | Feb. 11, 1936 |
| 2,206,044 | Novick | July 2, 1940 |
| 2,386,082 | Allridge | Oct. 2, 1945 |
| 2,932,104 | Corbett | Apr. 12, 1960 |